United States Patent
Ziv-Av

(10) Patent No.: US 6,186,770 B1
(45) Date of Patent: Feb. 13, 2001

(54) CLAMPING ASSEMBLY FOR INJECTION MOLDING APPARATUS

(76) Inventor: Amir Ziv-Av, 3 Hanasi, Kiryat Ono (IL)

(*) Notice: Under 35 U.S.C. 154(b), the term of this patent shall be extended for 0 days.

(21) Appl. No.: 09/263,095

(22) Filed: Mar. 5, 1999

(51) Int. Cl.⁷ .................................................. B29C 45/64
(52) U.S. Cl. .................. 425/590; 425/595; 425/451.2; 425/451.7; 425/451.9
(58) Field of Search .................................... 425/590, 595, 425/451.2, 451.7, 451.9

(56) References Cited

U.S. PATENT DOCUMENTS

| | | | |
|---|---|---|---|
| 3,104,433 | * 9/1963 | Hoern .................................... | 425/590 |
| 3,351,982 | * 11/1967 | Jackson et al. ........................ | 425/590 |
| 3,433,290 | * 3/1969 | Eggenberger et al. ................ | 425/590 |
| 3,465,387 | * 9/1969 | Allard et al. .......................... | 425/590 |
| 3,604,058 | 9/1971 | Fischbach . | |
| 3,704,973 | 12/1972 | Renfrew et al. . | |
| 4,781,568 | 11/1988 | Inanba . | |
| 4,797,086 | 1/1989 | Adachi . | |
| 4,828,475 | * 5/1989 | Kamiguchi ............................ | 425/590 |
| 4,828,476 | * 5/1989 | Yoshiharu et al. .................... | 425/590 |
| 4,929,165 | 5/1990 | Inaba et al. . | |
| 4,968,239 | 11/1990 | Inaba et al. . | |
| 4,984,980 | 1/1991 | Ueno . | |
| 5,110,283 | 5/1992 | Bluml et al. . | |
| 5,378,140 | 1/1995 | Asano et al. . | |
| 5,378,141 | 1/1995 | Aoki . | |
| 5,698,240 | 12/1997 | Haguchi . | |
| 5,731,017 | 3/1998 | Soncini et al. . | |
| 5,744,177 | 4/1998 | Lin . | |
| 5,773,050 | 6/1998 | Wohlrab . | |
| 5,776,516 | 7/1998 | Armbruster et al. . | |
| 5,811,139 | 9/1998 | Hehl . | |
| 5,879,726 | 3/1999 | Hsing . | |

FOREIGN PATENT DOCUMENTS 43 44 340   12/1993   (DE) .

OTHER PUBLICATIONS

Spec Sheet from Time And Precision Industries, Ltd., "Positioning Systems", obtained through Averi Technology Ltd., 31 Habarzel Street, 69710 Tel Aviv, Israel.

* cited by examiner

Primary Examiner—James P. Mackey
(74) Attorney, Agent, or Firm—Mark M. Friedman

(57) ABSTRACT

A clamping assembly for an injection molding apparatus includes a first platen attached to a base and a second platen slidingly associated with the base. A number of tiebars are mechanically linked to each of the platens through a number of mechanical linkages. An actuation system associated with the plurality of tiebars and with at least one of the platens is configured to generate movement of the second platen relative to the first platen. The mechanical linkage between each of the tiebars and at least one of the platens includes a threaded bushing engaged with a threaded portion of the tiebar. The actuation system is configured to generate relative rotation between each of the tiebars and a corresponding one of the threaded bushings.

19 Claims, 9 Drawing Sheets

CLAMPING ASSEMBLY FOR INJECTION MOLDING APPARATUS

FIELD AND BACKGROUND OF THE INVENTION

The present invention relates to clamping assemblies for injection molding, and, more particularly, to clamping assemblies for injection molding in which both closure of a mold and clamping during injection are achieved by relative rotation of complementary threaded elements.

A typical injection molding machine features a fixed platen and a complementary movable platen. The two platens are designed to come together so as to close between them a multi-part, typically a two-part, mold. With the two parts of the mold held firmly together, a molten plastic is injected under great pressure into the mold, thereby filling it. Once the plastic has cooled and hardened, the two parts of the mold are separated and the finished item is removed prior to repetition of the cycle.

This process requires two types of clamping displacement of the movable platen relative to the fixed platen. Firstly, the movable platen must provide an opening and closing function to allow removal of finished items and replacement of mold parts. This movement requires relatively small forces (typically not more than a few tons) but should occur as rapidly as possible to minimize wasted production time between injections. Secondly, during the injection process itself, very large clamping forces (with displacement of no more than a few millimeters) must be applied to prevent leakage from the mold under the high injection pressures used. Depending upon the size of machine and the particular application, clamping forces of tens or hundreds of tons may be required.

These two types of motion have commonly been achieved by use of a hydraulic piston or toggle mechanism located to the rear of the movable platen. However, the mechanical requirements to provide both the long range of movement and the large clamping forces required render these devices bulky. As a result, the clamping device frequently occupies more than 20% of the total length of the machine.

Various attempts have been made to arrive at a more compact clamping mechanism. One such attempt is disclosed in U.S. Pat. No. 5,776,516 to Armbrüster et al., which employs tiebars as clamping pins. A quick-locking mechanism fixes the effective length of the tiebars close to the movable platen and a set of short high-power pistons located on the fixed platen draws the tiebars to provide the required clamping force. Opening and closing movement is generated while the quick-locking mechanism is released by a separate low-power hydraulic piston adjacent to the platens.

Turning now briefly to clamping techniques known in other fields, there exist many clamping devices which are tightened by relative rotation of a threaded bolt and an internally threaded bushing. Such devices offer considerable advantages, providing large clamping forces from relatively low-power actuators such as electric or pneumatic motors. Devices of this type suffer, however, from problems associated with the large frictional losses inherent to conventional threaded connections, rendering them inferior for applications in which significant opening and closing movements are required frequently. For this and other reasons, clamping based on relative rotation of threaded elements has not been used for injection machine clamping applications.

There is therefore a need for a compact clamping assembly for injection molding machines which would employ relative rotation of complementary threaded elements to achieve both the opening/closing displacement and the required clamping forces between a movable platen and a fixed platen, providing a compact and efficient device.

SUMMARY OF THE INVENTION

The present invention is a clamping assembly for injection molding in which both an opening/closing displacement and clamping during injection are achieved by relative rotation of complementary threaded elements.

According to the teachings of the present invention there is provided, a clamping assembly for an injection molding apparatus comprising: (a) a base; (b) a first platen attached to the base; (c) a second platen slidingly associated with the base so as to be slidable towards and away from the first platen; (d) a plurality of tiebars mechanically linked to each of the first and second platens through a plurality of mechanical linkages; and (e) an actuation system associated with the plurality of tiebars and with at least one of the first and second platens and configured to generate movement of the second platen relative to the first platen, wherein at least a portion of each of the tiebars is threaded, and wherein the mechanical linkage between each of the tiebars and at least one of the first and second platens includes a threaded bushing engaged with the threaded portion, the actuation system being configured to generate relative rotation between each of the tiebars and a corresponding one of the threaded bushings.

According to a further feature of the present invention, the actuation system includes: (a) a first drive mechanism configured to generate relative rotation between each of the tiebars and a corresponding one of the threaded bushings so as to provide a first closing force directed to move the second platen towards the first platen; and (b) a second drive mechanism configured to apply a clamping torque between each of the tiebars and a corresponding one of the threaded bushings so as to generate a second closing force, the second closing force being at least an order of magnitude greater than the first closing force.

According to a further feature of the present invention, the first drive mechanism is configured to rotate the threaded bushings relative to the base.

According to an alternative feature of the present invention, the first drive mechanism is configured to rotate the tiebars relative to the base.

According to a further feature of the present invention, the first drive mechanism includes a mechanical link configured to maintain relative rotation between all of the tiebars and the corresponding ones of the threaded bushings substantially synchronous.

According to a further feature of the present invention, the mechanical link is implemented as at least one drive belt.

According to a further feature of the present invention, wherein the first drive mechanism includes a plurality of motors, each of the motors being mounted on one of the first and second platens and being connected in driving relation to generate relative rotation of one of the tiebars relative to a corresponding one of the threaded bushings.

According to a further feature of the present invention, the first drive mechanism further includes a control system for controlling the plurality of motors to generate substantially synchronous relative rotation between all of the tiebars and the corresponding threaded bushings so as to maintain parallel alignment of the first and second platens.

According to a further feature of the present invention, the first drive mechanism is configured to generate substantially synchronous relative rotation between all of the tiebars and the corresponding threaded bushings so as to maintain parallel alignment of the first and second platens.

According to a further feature of the present invention, the first drive mechanism is located adjacent to the first platen.

According to a further feature of the present invention, the second drive mechanism is located adjacent to the second platen.

According to an alternative feature of the present invention, both the first drive mechanism and the second drive mechanism are located adjacent to the second platen.

According to a further feature of the present invention, the second drive mechanism includes a plurality of lever arms.

According to a further feature of the present invention, the second drive mechanism further includes at least one actuator element, each actuator element being deployed to displace a first of the lever arms relative to a second of the lever arms.

According to a further feature of the present invention, each of the at least one actuator element is implemented as a pneumatic actuator element.

According to a further feature of the present invention, there is also provided a clutch assembly configured to assume an engaged state in which the second drive mechanism is in operative engagement to apply the clamping torque between each of the tiebars and a corresponding one of the threaded bushings and a disengaged state in which the operative engagement is interrupted so as to allow relative rotation between the tiebars and the threaded bushings generated by the first drive mechanism.

According to a further feature of the present invention, there is also provided a clutch assembly configured to assume a disengaged state in which the first drive mechanism is free to generate relative rotation between each of the tiebars and a corresponding one of the threaded bushings and an engaged state in which the first drive mechanism is locked relative to the base so as to provide a reaction to a clamping torque between the tiebars and the threaded bushings generated by the second drive mechanism.

According to a further feature of the present invention, there is also provided a ratchet assembly associated with the second drive mechanism, the ratchet assembly being configured to provide a locked rotational direction which allows the second drive mechanism to apply the clamping torque between each of the tiebars and a corresponding one of the threaded bushings and a free rotational direction which allows selective relative rotation between the tiebars and the threaded bushings generated by the first drive mechanism independent of the second drive mechanism.

According to a further feature of the present invention, each of the threaded bushings includes a planetary arrangement of threaded rollers. Alternatively, each of the threaded bushings may include a ball-screw assembly.

Finally, it should be noted that, in certain preferred embodiments, synchronization of the linear motion resulting from rotation of the complementary threaded elements may be relied upon as the primary source of parallelism of the platens.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
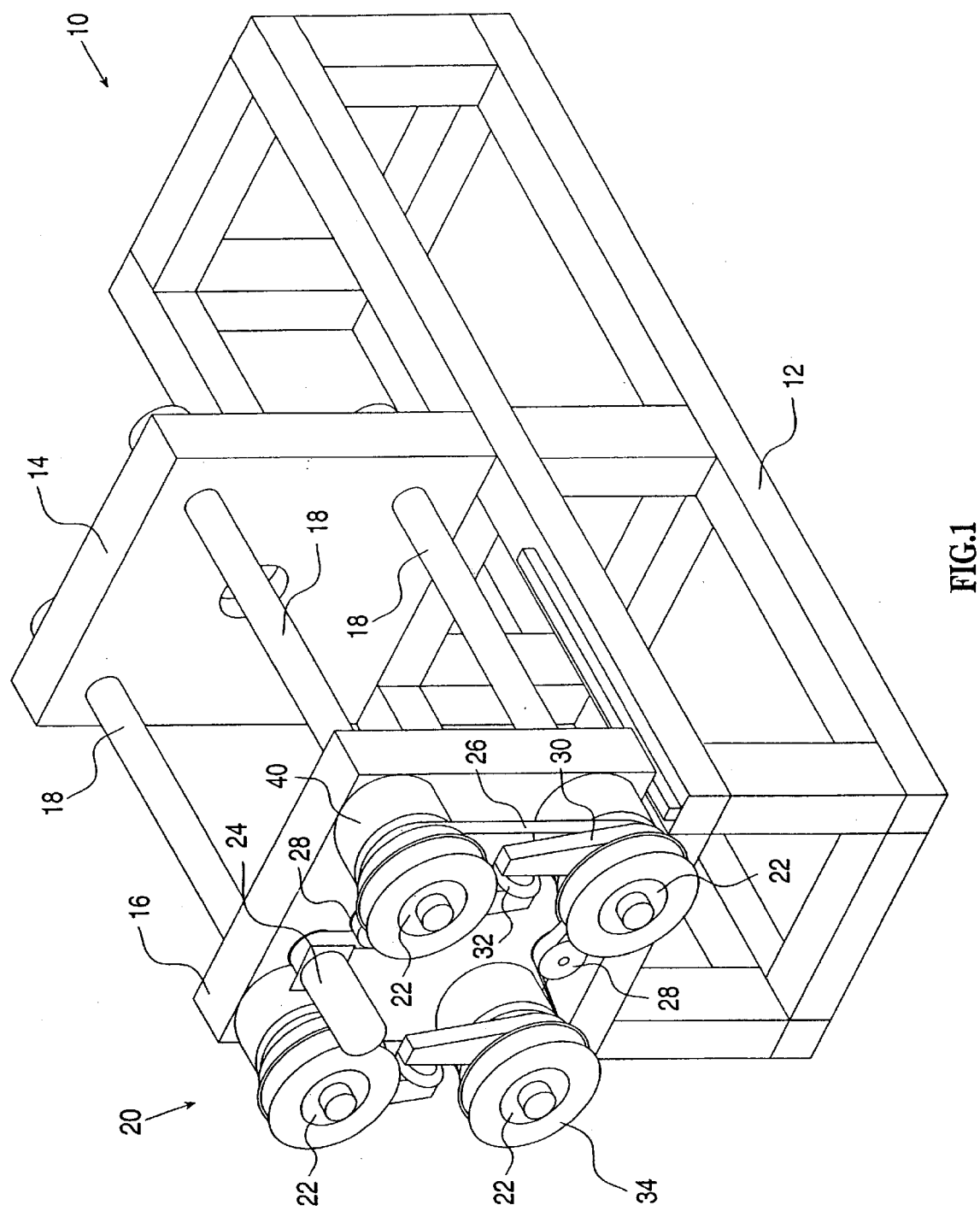
FIG. 1 is an isometric view of a first embodiment of a clamping assembly, constructed and operative according to the teachings of the present invention, for an injection molding apparatus, the clamping assembly being shown in an open position.
Figure 2:
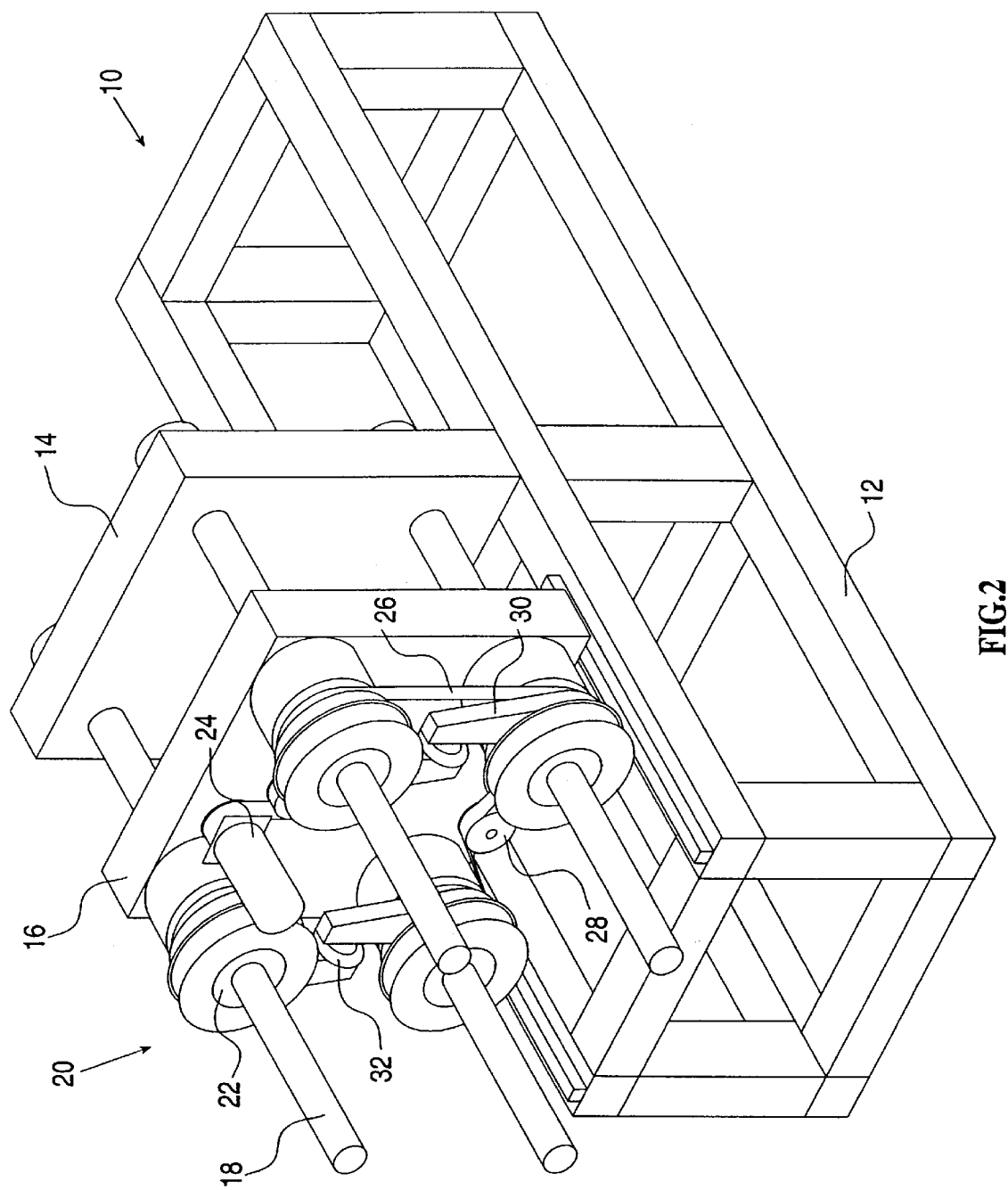
FIG. 2 is an isometric view of the clamping assembly of FIG. 1 shown in a closed position.
Figure 3:
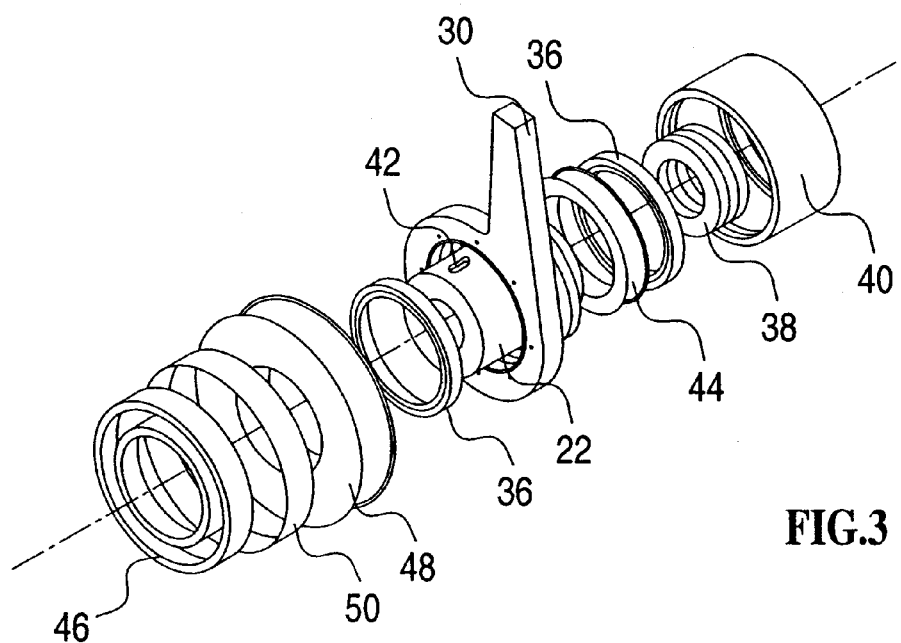
FIG. 3 is an exploded isometric view of a bushing assembly from the clamping assembly of FIG. 1.

The present invention is a clamping assembly for injection molding in which both an opening/closing displacement and clamping during injection are achieved by relative rotation of complementary threaded elements.

The principles and operation of clamping assemblies according to the present invention may be better understood with reference to the drawings and the accompanying description.

Referring now to the drawings, FIGS. 1–5 show a first embodiment of a clamping assembly, generally designated 10, constructed and operative according to the teachings of the present invention, for an injection molding apparatus. Generally speaking, clamping assembly 10 includes a fixed platen 14 attached to a base 12, typically in a rigid manner, and a movable platen 16 slidingly associated with base 12 so as to be slidable towards and away from fixed platen 14. A number of tiebars 18 are mechanically linked to each platen through a plurality of mechanical linkages. An actuation system 20 is associated with the tiebars and with at least one of platens 14 and 16. Actuation system 20 is configured to generate movement of movable platen 16 relative to the fixed platen 14.

It is a particular feature of the present invention that movement of movable platen 16 is generated by relative rotation of complementary threaded elements. To this end, at least a portion, and typically substantially all, of each tiebar 18 is threaded, and the mechanical linkage between each of tiebars 18 and at least one of platens 14 and 16 includes a threaded bushing 22 engaged with the tiebar's threaded portion. Actuation system 20 is configured to generate relative rotation between each of tiebars 18 and a corresponding one of threaded bushings 22, thereby causing movement of movable platen 16 relative to fixed platen 14.

In a basic implementation, the present invention may be implemented using a bushing with conventional internal threading. However, as mentioned above, the high frictional losses of sliding contact between threaded elements render such an implementation somewhat problematic. To reduce the frictional losses, threaded bushings 22 may advantageously be implemented using a ball-screw assembly. Ball screws, however, may require relatively large assemblies to withstand the large axial forces required in the present invention. To provide what is believed to be the optimal combination of low friction, ability to withstand large axial forces and compactness, most highly preferred embodiments of the present invention preferably employ a planetary arrangement of threaded rollers, commonly referred to as a "planetary roller screw". Examples of suitable planetary roller screws are commercially available from Rollvis, Switzerland. All of the aforementioned options are referred to collectively as "internally threaded" according to the function which they perform, i.e., screw-type engagement with an externally threaded element.

It will be readily apparent that the use of rotation of complementary threaded elements to achieve relative motion and clamping of the platens provides a number of advantages. Firstly, it minimizes the size of the injection machine by avoiding the use of large external pistons or toggle mechanisms. Furthermore, since all clamping forces are localized within the region of the tiebars and platens, base 12 is effectively isolated from the clamping forces, thereby providing improved precision while allowing reduction of the structural bulk of the base. Additionally, the effective step-down gear effect offered by the screw-type engagement allows the use of actuating mechanisms based on electrical or pneumatic elements rather than the more costly and complicated hydraulic mechanisms conventionally required. These and other advantages will become clearer from the detailed description to follow.

As mentioned above, it is a particular feature of most preferred implementations of the present invention that the relative rotation of tiebars 18 and threaded bushings 22 is used to provide both the relatively rapid movement required for moving platens 14 and 16 towards each other to close a mold and the large clamping force required during the injection process. For the former, the main priority is the closing (and opening) speed of the platens, which is preferably at least about a decimeter per second, and typically several decimeters per second. For the latter, the main priority is the required magnitude of the clamping force, which is defined according to the intended application and typically lies in the range of tens or hundreds of tons.

In many cases, it is possible to implement the present invention employing a single drive mechanism to achieve both types of motion. Typically, this would be achieved by direct connection of an electric or hydraulic motor, or a set of such motors, to drive rotation of either tiebars 18 or threaded bushings 22. One example of such an implementation will be described below with reference to FIG. 9. In most cases, however, unacceptably large and expensive motors would be required in order to generate the required torque for effective clamping. For this reason, most preferred embodiments of the present invention subdivide actuation system 20 into two separate but interrelated drive mechanisms configured, respectively, to generate the rapid closing motion and effective clamping. While exact specifications vary from case to case, the clamping drive mechanism is generally configured to provide a closing force at least one, and preferably at least about two, orders of magnitude greater than that of the rapid closing motion drive mechanism.

At this point, before addressing certain configurations in detail, it should be appreciated that the principles of the present invention may be applied in numerous permutations. In all cases, threaded bushings 22 may be deployed at either or both of platens 14 and 16, thereby determining in which direction tiebars 18 will project when the platens come together. Actuation system 20 may also be deployed adjacent to either platen or, in the case that two separate drive mechanisms are provided, may be split into two parts, one associated with each platen. Finally, actuation system 20 may generate the required relative rotation by rotating either tiebars 18 or bushings 22 relative to the base or, in the case that two separate drive mechanisms are provided, may rotate one to generate the rapid motion and the other to apply clamping force. While the invention will be illustrated with respect to a number of preferred embodiments, it should be appreciated that all available permutations of the aforementioned factors also fall within the general scope of the invention.

Turning now to the features of the first embodiment of the present invention in more detail, clamping assembly 10 provides both separate drive mechanisms for generating a rapid closing motion and providing effective clamping, both associated with movable platen 16. The power source for the drive mechanism rapid motion is preferably an electric motor 24 which is mechanically linked, in this case through a tensioned drive belt 26, so as to turn each of threaded bushings 22. Sufficient tension, as well as an enhanced extent of angular engagement with each bushing, is provided by an arrangement of guide rollers 28.

It will be noted that drive belt 26, or any other mechanical link employed, preferably performs a very valuable synchronizing function. Specifically, by maintaining the relative rotation between all of tiebars 18 and the corresponding threaded bushings 22 substantially synchronous, the clamping assembly inherently preserves parallel alignment of first and second platens 14 and 16. As a result, the linear bearing between base 12 and movable platen 16 need not provide large reactions to forces acting to generate inclination of the platen, allowing use of compact bearing assemblies.

Turning now to the mechanism for generating clamping forces, this is shown here to include a lever arm 30 associated with each threaded bearing 22. Lever arms 30 are deployed in pairs such that an actuator element 32 can be deployed between them to generate a displacement of one lever arm 30 relative to a second lever arm 30. The use of relative displacement of two lever arms provides a self-balancing correction to the clamping forces, helping to avoid excessive localized pressure on one part of a mold. Given the considerable torque enhancement provided by lever arms 30, actuator element 32 may advantageously be implemented as a pneumatic actuator element such as a bellows cylinder, examples of which are commercially available from Bosch, Germany.

In order that lever arms 30 and actuator elements 32 should not impede rotation of bushings 22 by motor 24 and belt 26, a clutch assembly 34 is preferably provided. Clutch assembly 34 is configured to assume an engaged state in which lever arms 30 are operatively engaged with threaded bushings 22 to apply a clamping torque, and a disengaged state in which the operative engagement is interrupted so as to allow motor 24 and belt 26 to rotate threaded bushings 22 unimpeded.

It will be apparent to one ordinarily skilled in the art that clutch assembly 34 may be implemented using a wide range of conventional clutch or brake mechanisms. By way of example, with reference to FIGS. 3 and 4, an implementation using a concentric pneumatic clutch structure will now be described.

Figure 4:
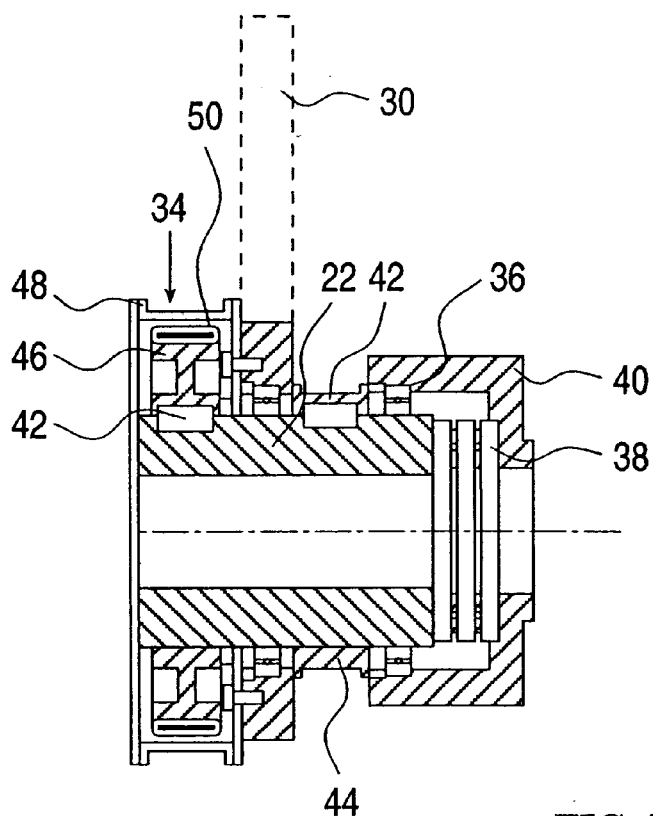
FIG. 4 is a cross-section taken through the bushing assembly of FIG. 3.
Figure 5:
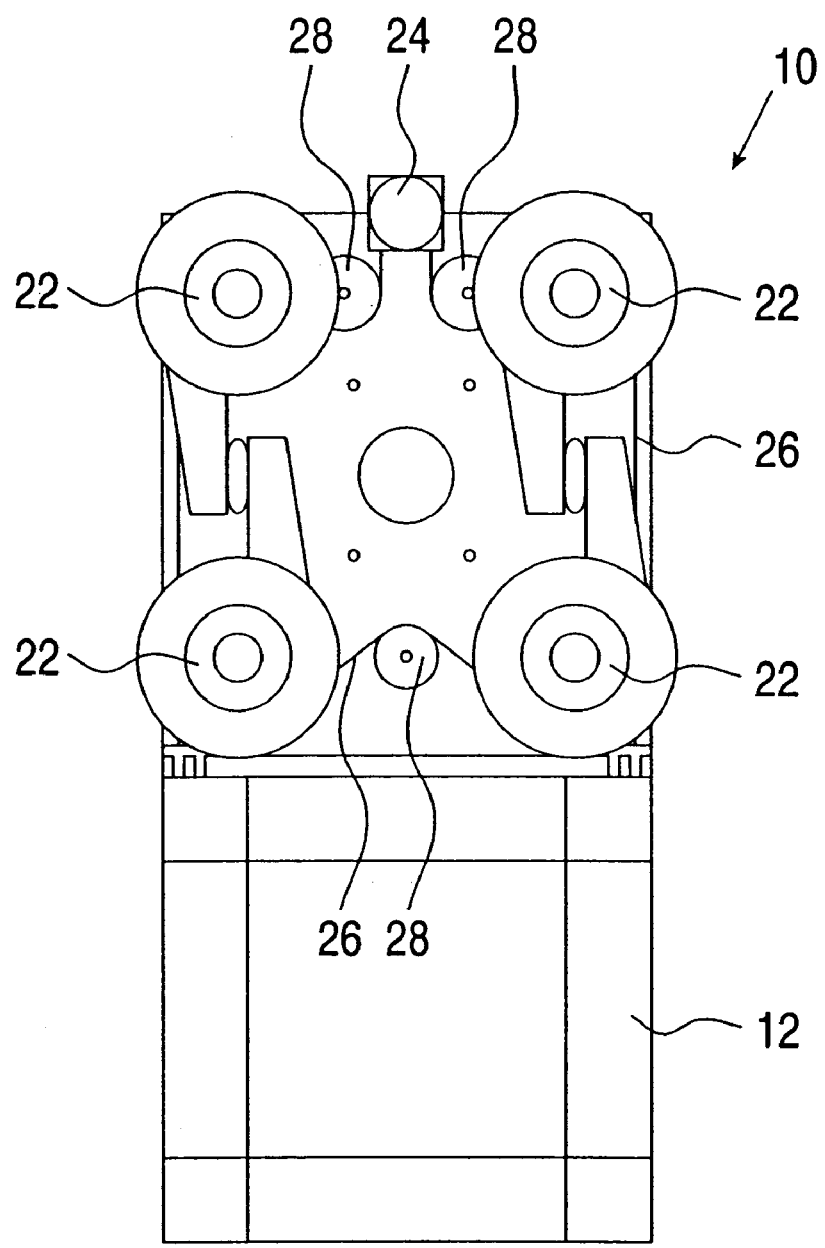
FIG. 5 is an end view of the clamping assembly of FIG. 1 taken from the side of the moving platen.

As seen most clearly in FIG. 4, bushing 22 is seated relative to a housing 40 attached to the platen via a peripheral bearing assembly 36 and an end bearing assembly 38. The outer surface of bushing 22 features two locking features 42 which lock bushing 22 to rotate as a unit with a drive-belt track 44 and the inner element 46 of clutch assembly 34. The base bracket of lever arm 30 is rotatably mounted around bushing 22 by a second peripheral bearing assembly 36 while being rigidly bolted to the outer element 48 of clutch 34. An inflatable sleeve 50 is deployed between clutch elements 46 and 48, selectively locking them together against rotation when inflated.

When sleeve 50 is in a deflated state, bushing 22 is free to be driven by drive belt 26 passing over drive-belt track 44 so as to rotate without changing the position of lever arm 30. When the rapid closing motion is complete, sleeve 50 is inflated, thereby locking lever arm 30 into fixed rotational alignment with bushing 22 so that actuator element 32 is effective to apply a clamping torque to bushing 22. After the injection process is complete, sleeve 50 is deflated, then allowing drive belt 26 to drive bushing 22 in a reverse direction to open the mold.

Figure 6:
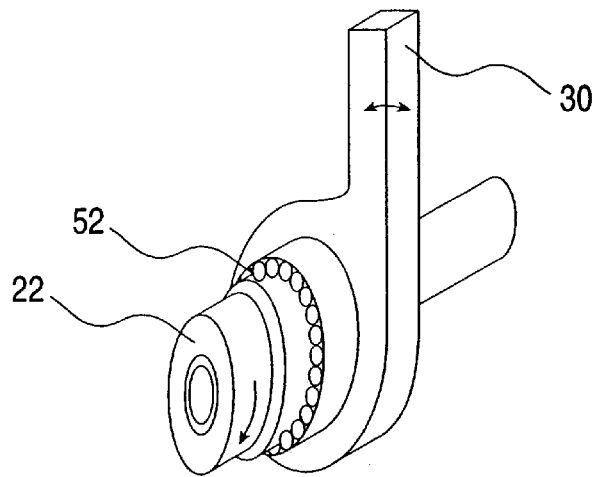
FIG. 6 is a schematic isometric view of an alternative bushing assembly for use in the clamping assembly of FIG. 1.

Turning briefly to FIG. 6, there is shown a further alternative in which clutch assembly 34 is replaced by a ratchet assembly 52. In this case, ratchet assembly 52 is configured to provide a locked rotational direction which allows lever arm 30 to apply a clamping torque to threaded bushing 22 and a free rotational direction which allows rotation of threaded bushing 22 in a closing direction, i.e., in the sense which brings the platens towards each other, without turning lever arm 30.

In use, closing of the platens and application of clamping force can be performed sequentially without requiring any locking action or the like. A release mechanism is provided to disengage the ratchet mechanism when opening of the mold is required.

Figure 7:
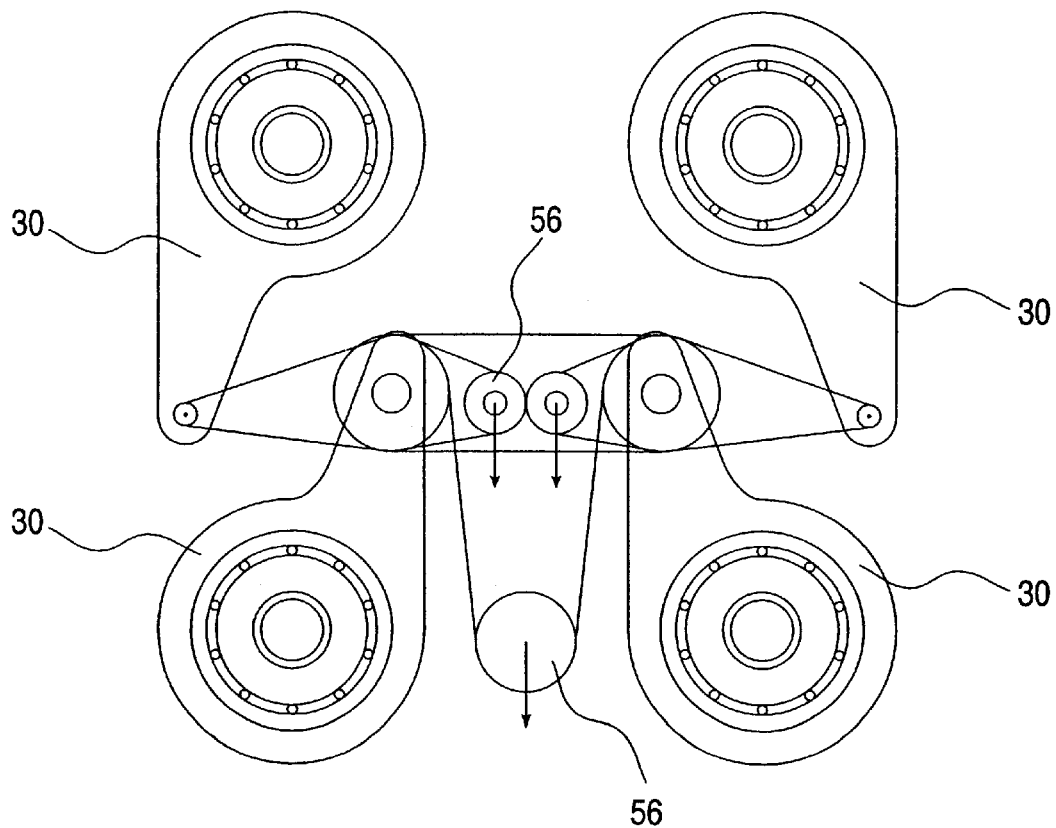
FIG. 7 is a schematic representation of an alternative clamping force drive mechanism for use in the clamping assembly of FIG. 1.

FIG. 7 shows schematically an alternative actuator replacing actuator elements 32 for applying torque to lever arms 30. In this case, a tightening cable 54 is wrapped so as to encircle pairs of lever arms 30 and a displaceable pulley 56 is provided to apply tension to the cable. The functionality of the mechanism, including its self-balancing features, parallels that described above.

Figure 8:
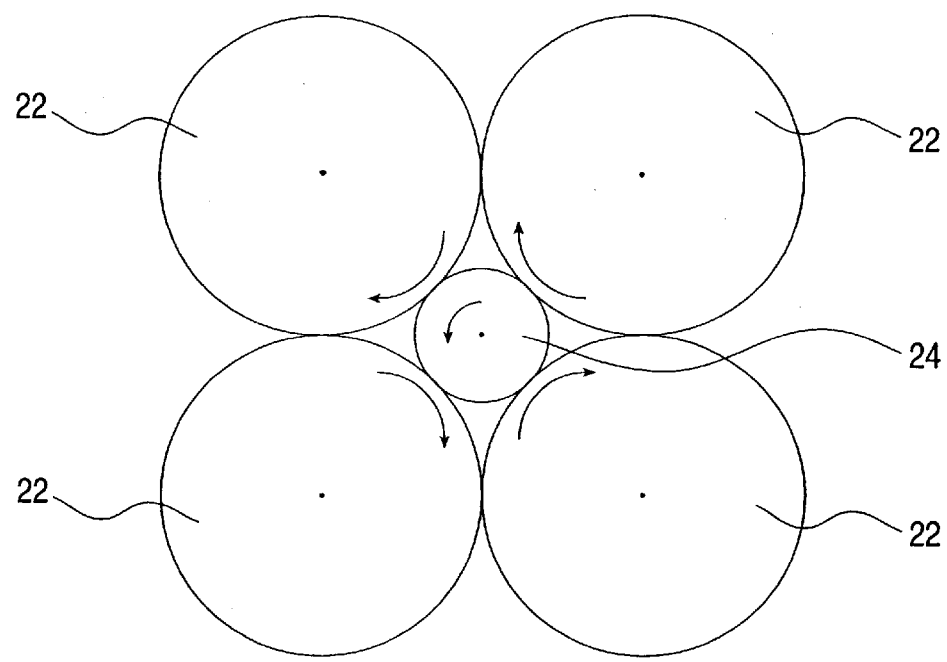
FIG. 8 is a schematic representation of an alternative opening and closing displacement drive mechanism for use in the clamping assembly of FIG. 1.

Turning now to FIG. 8, it should be noted that a mechanical link between the various driven elements may be achieved in numerous ways, not necessarily employing a drive belt. FIG. 8 illustrates schematically a further possibility of direct connection through frictional contact or gear wheels with a motorized drive wheel, in this case mounted centrally. Parenthetically, it should be noted that the directions of rotation of the threaded elements need not necessarily be similar. Thus, a combination of tiebars with right-handed and left-handed threading, and corresponding threaded bushings 22 may be used. Similarly, if desired, threads of differing pitches could be used. In such cases, where reference is made to "synchronicity", it is evaluated according to the resultant rate of linear movement, independent of directions and rates of rotation.

Figure 9:
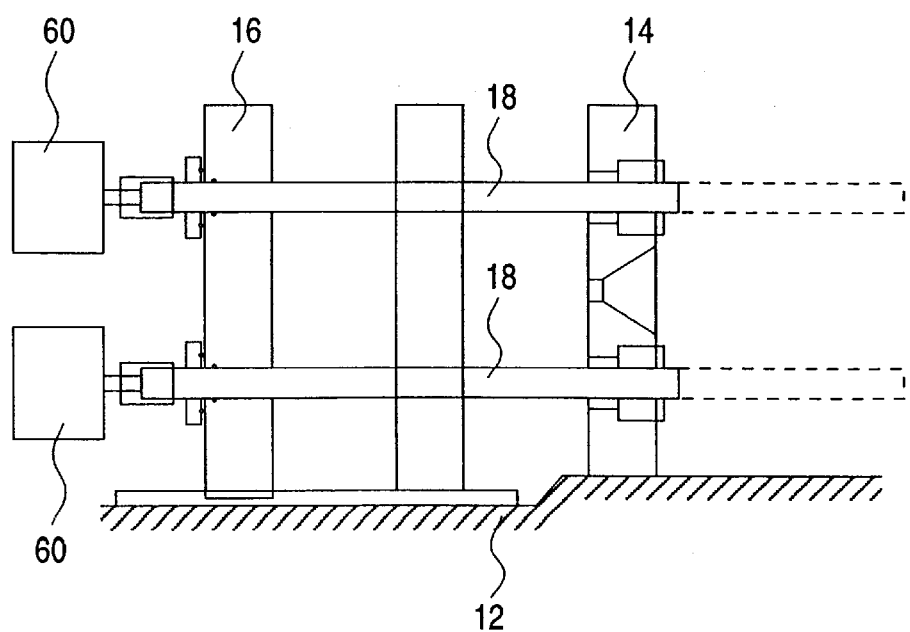
FIG. 9 is a schematic side view of a second embodiment of a clamping assembly, constructed and operative according to the teachings of the present invention.

Turning now to FIG. 9, as mentioned above, threaded bushings 22 may alternatively be provided at the static platen 14. In this case, tiebars 18 will extend to the rear of static platen 14 when the platens are closed towards each other. The embodiment shown here also illustrates the possibility of a set of motors 60 each being employed to drive rotation of one tiebar 18. In such an implementation, the preferred feature of synchronicity of rotation between the tiebars can be ensured by use of a control system. By way of example, each motor may be provided with an encoder to read its position. One motor is designated a "master" and the remaining motors "slaves" with an adaptive control system to maintain synchronicity between them. The details of such an implementation will be clear to one of ordinary skill in the art.

Figure 10:
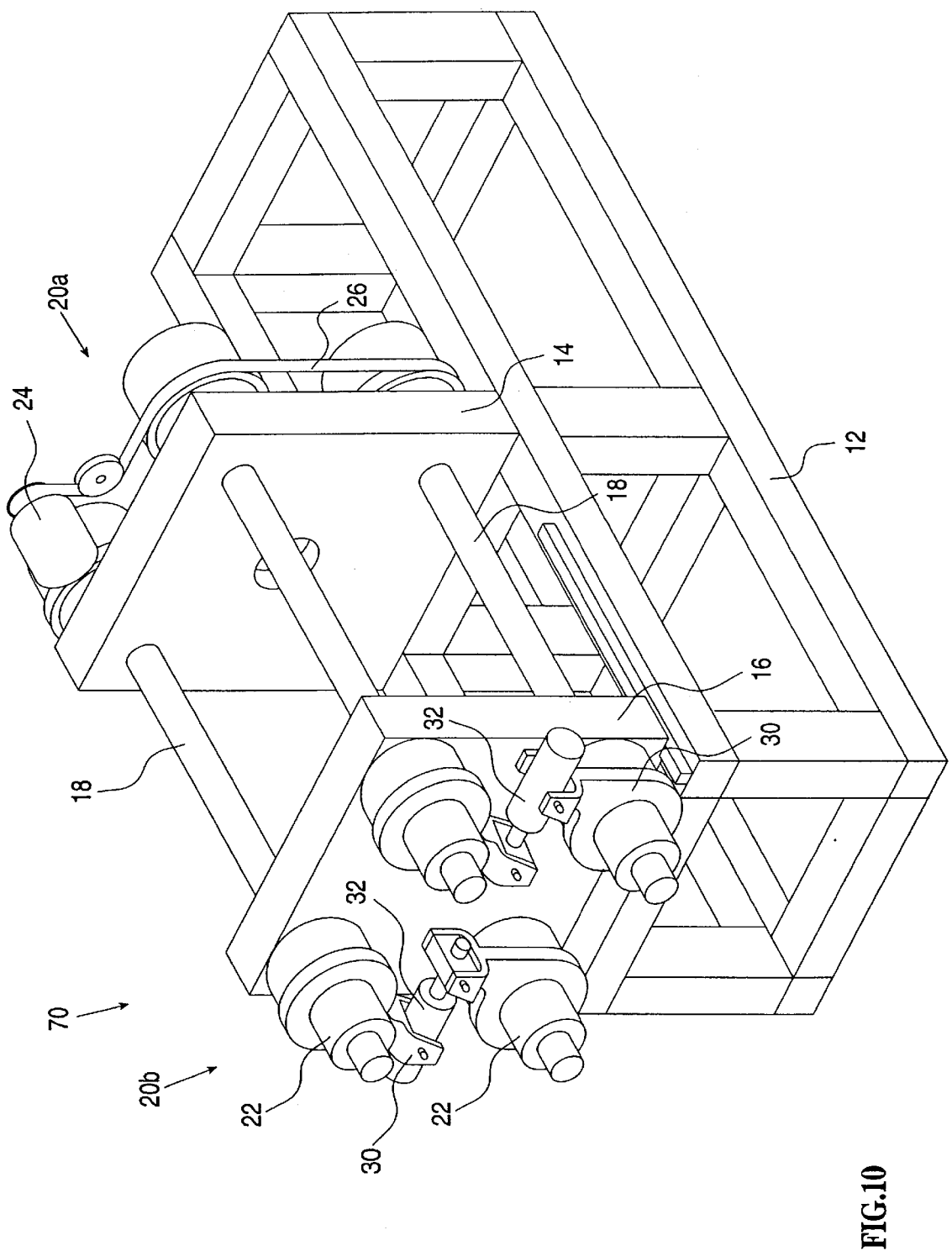
FIG. 10 is a first isometric view of a third embodiment of a clamping assembly, constructed and operative according to the teachings of the present invention.
Figure 11:
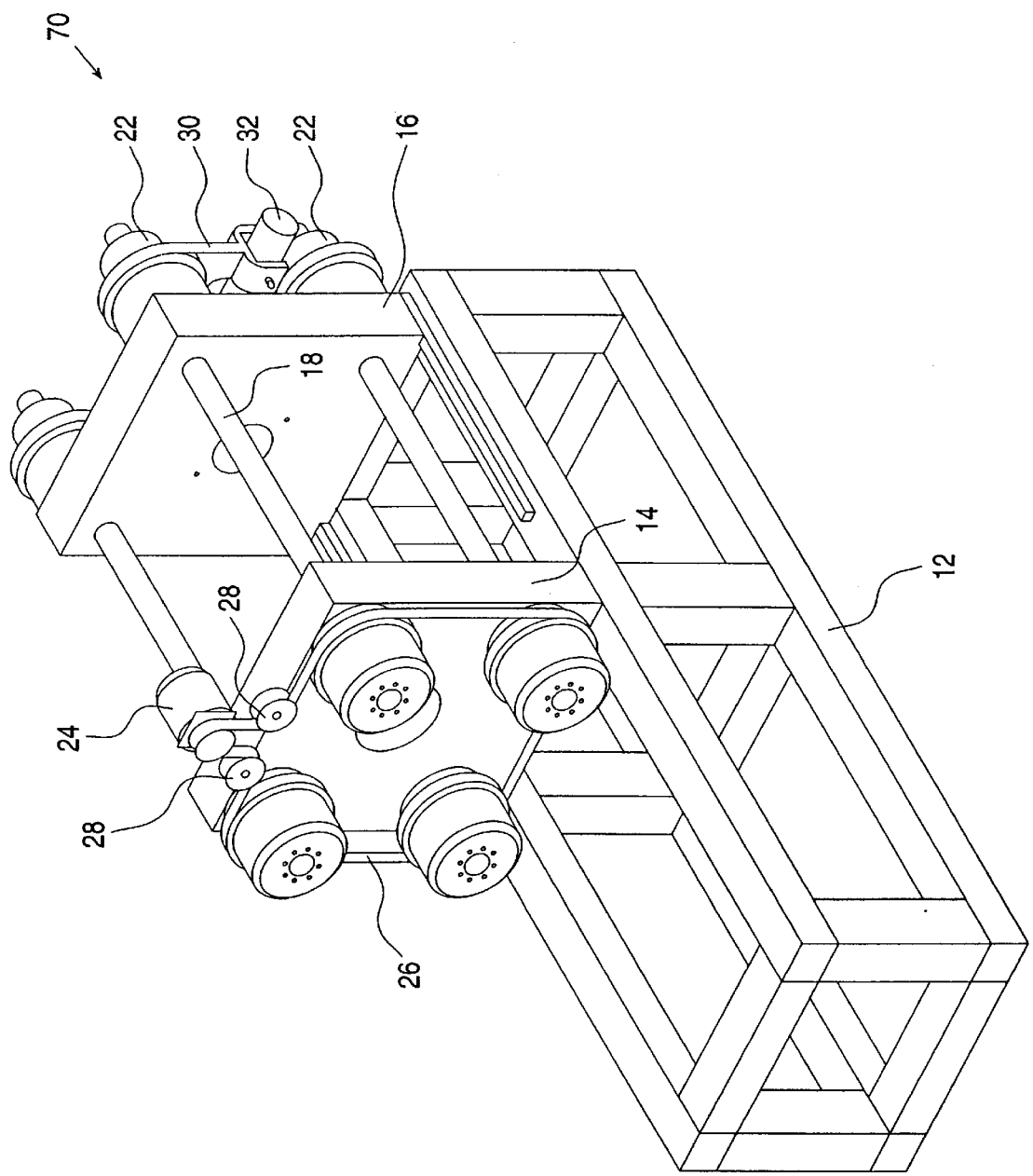
FIG. 11 is a second isometric view of the clamping assembly of FIG. 10.
Figure 12:
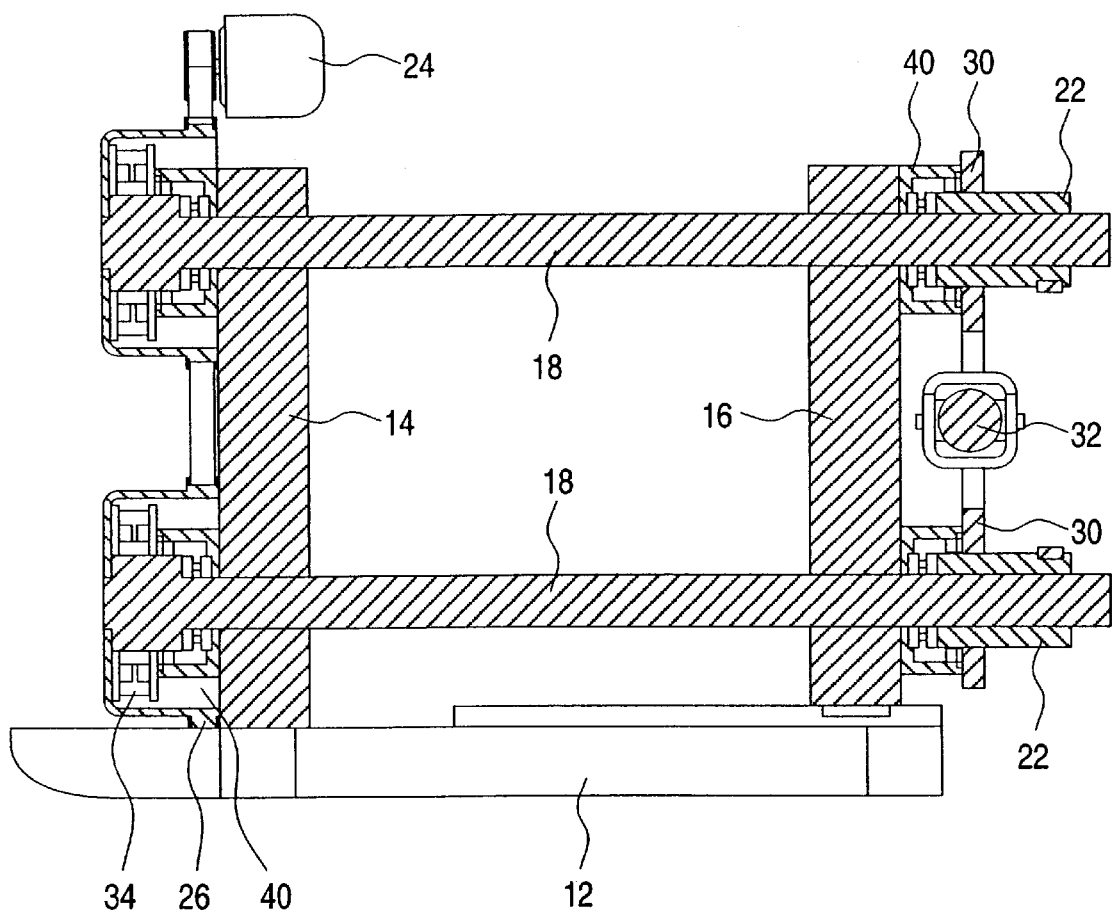
FIG. 12 is a longitudinal cross-sectional view through the clamping assembly of FIG. 11.

Turning now to FIGS. 10–12, there is shown a third preferred embodiment of a clamping assembly, generally designated 70, constructed and operative according to the teachings of the present invention. Clamping assembly 70 is generally similar to clamping assembly 10 described above, equivalent elements being labeled similarly. A primary difference between clamping assembly 70 and clamping assembly 10 is that the actuation system is here divided between the platens, having a first drive mechanism 20a located adjacent to static platen 14 and a second drive mechanism 20b located adjacent to movable platen 16.

In this case, motor 24, drive belt 26 and guide rollers 28 are deployed in a compact configuration on the rear side of static platen 14 so as to rotate tiebars 18 in a synchronous manner. During the rapid closing motion, threaded bushings 22 at the movable platen 16 are held effectively fixed by lever arms 30 and actuator elements 32. Then, when clamping force is required, actuator elements 32 act on lever arms 30 to rotate bushings 22 while the tiebars remain still.

This embodiment also preferably provides a clutch assembly 34, this time deployed to selectively lock drive mechanism 20a to ensure a sufficient reaction to prevent the tiebars from turning when a clamping torque is applied to bushing 22. Specifically, the clutch is configured to assume a disengaged state in which drive mechanism 20a is free to generate relative rotation between each tiebar 18 and its corresponding threaded bushing 22 and an engaged state in which drive mechanism 20a is locked to rotation relative to base 12 so as to provide a reaction to a clamping torque between tiebars 18 and threaded bushings 22 generated by drive mechanism 20b. The details of implementation of clutch assembly 34 may be understood from FIG. 12 by analogy to FIGS. 3 and 4 and the accompanying description.

Finally, clamping assembly 70 exemplifies a further form of actuator element 32 in the form of a small hydraulic, or preferably pneumatic, piston.

It will be appreciated that the above descriptions are intended only to serve as examples, and that many other embodiments are possible within the spirit and the scope of the present invention.

What is claimed is:

1. A clamping assembly for an injection molding apparatus comprising:
   (a) a base;
   (b) a first platen attached to said base;
   (c) a second platen slidingly associated with said base so as to be slidable towards and away from said first platen;
   (d) a plurality of tiebars mechanically linked to each of said first and second platens through a plurality of mechanical linkages; and
   (e) an actuation system associated with said plurality of tiebars and with at least one of said first and second platens and configured to generate movement of said second platen relative to said first platen, wherein at least a portion of at least two of said tiebars is threaded, and wherein said mechanical linkage between each of said at least two tiebars and at least one of said first and second platens includes a threaded bushing engaged with said threaded portion, said actuation system being configured to generate relative rotation between each of said at least two tiebars and the corresponding one of said threaded bushings, and wherein said actuation system includes:

(i) a first drive mechanism configured to generate relative rotation between each of said at least two tiebars and the corresponding one of said threaded bushings so as to generate parallel displacement of said second platen relative to said first platen; and (ii) a second drive mechanism configured to apply a clamping torque between each of said at least two tiebars and the corresponding one of said threaded bushings so as to generate a closing force, said second drive mechanism being configured to distribute said clamping torque substantially equally between said at least two tiebars.

2. The clamping assembly of claim 1, wherein said first drive mechanism is configured to rotate said threaded bushings relative to said base.

3. The clamping assembly of claim 1, wherein said first drive mechanism is configured to rotate said tiebars relative to said base.

4. The clamping assembly of claim 1, wherein said first drive mechanism includes a mechanical link configured to maintain relative rotation between all of said tiebars and said corresponding ones of said threaded bushings substantially synchronous.

5. The clamping assembly of claim 4, wherein said mechanical link is implemented as at least one drive belt.

6. The clamping assembly of claim 1, wherein said first drive mechanism includes a plurality of motors, each of said motors being mounted on one of said first and second platens and being connected in driving relation to generate relative rotation of one of said tiebars relative to a corresponding one of said threaded bushings.

7. The clamping assembly of claim 6, wherein said first drive mechanism further includes a control system for controlling said plurality of motors to generate substantially synchronous relative rotation between all of said tie bars and said corresponding threaded bushings so as to maintain parallel alignment of said first and second platens.

8. The clamping assembly of claim 1, wherein said first drive mechanism is configured to generate substantially synchronous relative rotation between all of said tiebars and said corresponding threaded bushings so as to maintain parallel alignment of said first and second platens.

9. The clamping assembly of claim 1, wherein said first drive mechanism is located adjacent to said first platen.

10. The clamping assembly of claim 9, wherein said second drive mechanism is located adjacent to said second platen.

11. The clamping assembly of claim 1, wherein both said first drive mechanism and said second drive mechanism are located adjacent to said second platen.

12. The clamping assembly of claim 1, wherein said second drive mechanism includes a plurality of lever arms.

13. The clamping assembly of claim 12, wherein said second drive mechanism further includes at least one actuator element, each actuator element being deployed to displace a first of said lever arms relative to a second of said lever arms.

14. The clamping assembly of claim 13, wherein each of said at least one actuator element is implemented as a pneumatic actuator element.

15. The clamping assembly of claim 1, further comprising a clutch assembly configured to assume an engaged state in which said second drive mechanism is in operative engagement to apply said clamping torque between each of said tiebars and a corresponding one of said threaded bushings and a disengaged state in which said operative engagement is interrupted so as to allow relative rotation between said tiebars and said threaded bushings generated by said first drive mechanism.

16. The clamping assembly of claim 1, further comprising a clutch assembly configured to assume a disengaged state in which said first drive mechanism is free to generate relative rotation between each of said tiebars and a corresponding one of said threaded bushings and an engaged state in which said first drive mechanism is locked relative to said base so as to provide a reaction to a clamping torque between said tiebars and said threaded bushings generated by said second drive mechanism.

17. The clamping assembly of claim 1, further comprising a ratchet assembly associated with said second drive mechanism, said ratchet assembly being configured to provide a locked rotational direction which allows said second drive mechanism to apply said clamping torque between each of said tiebars and a corresponding one of said threaded bushings and a free rotational direction which allows selective relative rotation between said tiebars and said threaded bushings generated by said first drive mechanism independent of said second drive mechanism.

18. The clamping assembly of claim 1, wherein each of said threaded bushings includes a planetary arrangement of threaded rollers.

19. The clamping assembly of claim 1, wherein each of said threaded bushings includes a ball-screw assembly.

* * * * *